United States Patent
Gatto et al.

(10) Patent No.: US 10,403,304 B1
(45) Date of Patent: Sep. 3, 2019

(54) NEURAL NETWORKS FOR IDENTIFYING THE POTENTIAL OF DIGITIZED AUDIO TO INDUCE FRISSON IN LISTENERS

(71) Applicant: Qbrio Studio, Inc., Los Angeles, CA (US)

(72) Inventors: Jonathan A. Gatto, Los Angeles, CA (US); Asa W. Kaplan, Mountain View, CA (US)

(73) Assignee: QBRIO STUDIO, INC., Los Angeles, CA (US)

(*) Notice: Subject to any disclaimer, the term of this patent is extended or adjusted under 35 U.S.C. 154(b) by 0 days.

(21) Appl. No.: 15/920,283

(22) Filed: Mar. 13, 2018

(51) Int. Cl.
| | |
|---|---|
| *G10L 25/30* | (2013.01) |
| *G10L 25/24* | (2013.01) |
| *G10L 25/48* | (2013.01) |
| *G06N 3/04* | (2006.01) |
| *G06F 5/01* | (2006.01) |
| *G06N 3/08* | (2006.01) |
| *G06F 17/14* | (2006.01) |

(52) U.S. Cl.
CPC ............... *G10L 25/30* (2013.01); *G06F 5/01* (2013.01); *G06F 17/141* (2013.01); *G06N 3/04* (2013.01); *G06N 3/08* (2013.01); *G10L 25/24* (2013.01); *G10L 25/48* (2013.01)

(58) Field of Classification Search
CPC ....................................................... G10L 25/30
See application file for complete search history.

(56) References Cited

U.S. PATENT DOCUMENTS

| | | |
|---|---|---|
| 5,616,876 A | 4/1997 | Cluts |
| 6,201,176 B1 | 3/2001 | Yourlo |
| 6,539,395 B1 | 3/2003 | Gjerdingen et al. |
| 8,260,778 B2 | 9/2012 | Ghatak |
| 9,788,777 B1 | 10/2017 | Knight et al. |
| 2015/0297109 A1 | 10/2015 | Garten et al. |
| 2016/0196105 A1 | 7/2016 | Vartakavi et al. |

*Primary Examiner* — Yu-Hsi D Sun
(74) *Attorney, Agent, or Firm* — Klarquist Sparkman, LLP

(57) ABSTRACT

Methods and apparatus are disclosed for generating predictions of tendencies of a waveform segment to induce frisson. In one example, a method includes producing Mel-frequency cepstral coefficients corresponding to an audio waveform, dividing the waveform into a plurality of segments that have been tagged with a value indicating a likelihood that the segment will produce a frisson response in a listener, and training a neural network with the Mel-frequency cepstral coefficients and the segment tag values to generate predictions of a tendency of a waveform segment to induce frisson. In some examples, the method further includes displaying a visualization of the waveform, wherein the visualization indicates how likely portions of the visualized waveform are to induce frisson.

24 Claims, 10 Drawing Sheets

NEURAL NETWORKS FOR IDENTIFYING THE POTENTIAL OF DIGITIZED AUDIO TO INDUCE FRISSON IN LISTENERS

BACKGROUND

Frisson is a sensation that humans can experience in response to various stimuli. Frisson can manifest in the form of a physical sensation, such as chills or shivers, a physiological reaction including goosebumps, increased skin conductance, increased heart rate, increased respiration rate, and pupil dilation, and/or a powerful emotional response. Some people can experience frisson in response to listening to music. Some estimates are that around 50% of the population can experience frisson in response to music. However, only certain portions of certain pieces of music tend to reliably induce frisson independent of the semantic content of lyrics or associated imagery/video.

SUMMARY

Frisson is a strong, acute physical and emotional response that can sometimes be experienced by a person listening to music or other aural sensations. Frisson tends to be a pleasurable experience that can involve chills along someone's spine, goosebumps, or other similar sensations. Frisson sensations generally last for a short duration and typically occur in response to listening to particular sections of audio input (e.g., a song or piece of music). In some examples, a song is generally a piece of music, which may or may not include lyrics, although the terms "song" and "music" are used synonymously in this disclosure. In some examples songs may not include sung or spoken words in a known language. While some individuals may experience a personal frisson response to a particular song or portion of a song that does not tend to induce frisson in other listeners, many songs tend to cause a frisson response among a wide variety of listeners. These songs tend to have certain traits in common. Disclosed herein are exemplary methods for identifying songs and portions of songs that tend to induce frisson. By identifying a wide variety of song fragments that induce frisson, the musical features that tend to most reliably produce the frisson response can be identified. This can be useful for musicians and composers who wish to create music that induces frisson, as they can then tailor their compositions to contain and/or enhance the identified features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

DETAILED DESCRIPTION

General Considerations

Figure 1:
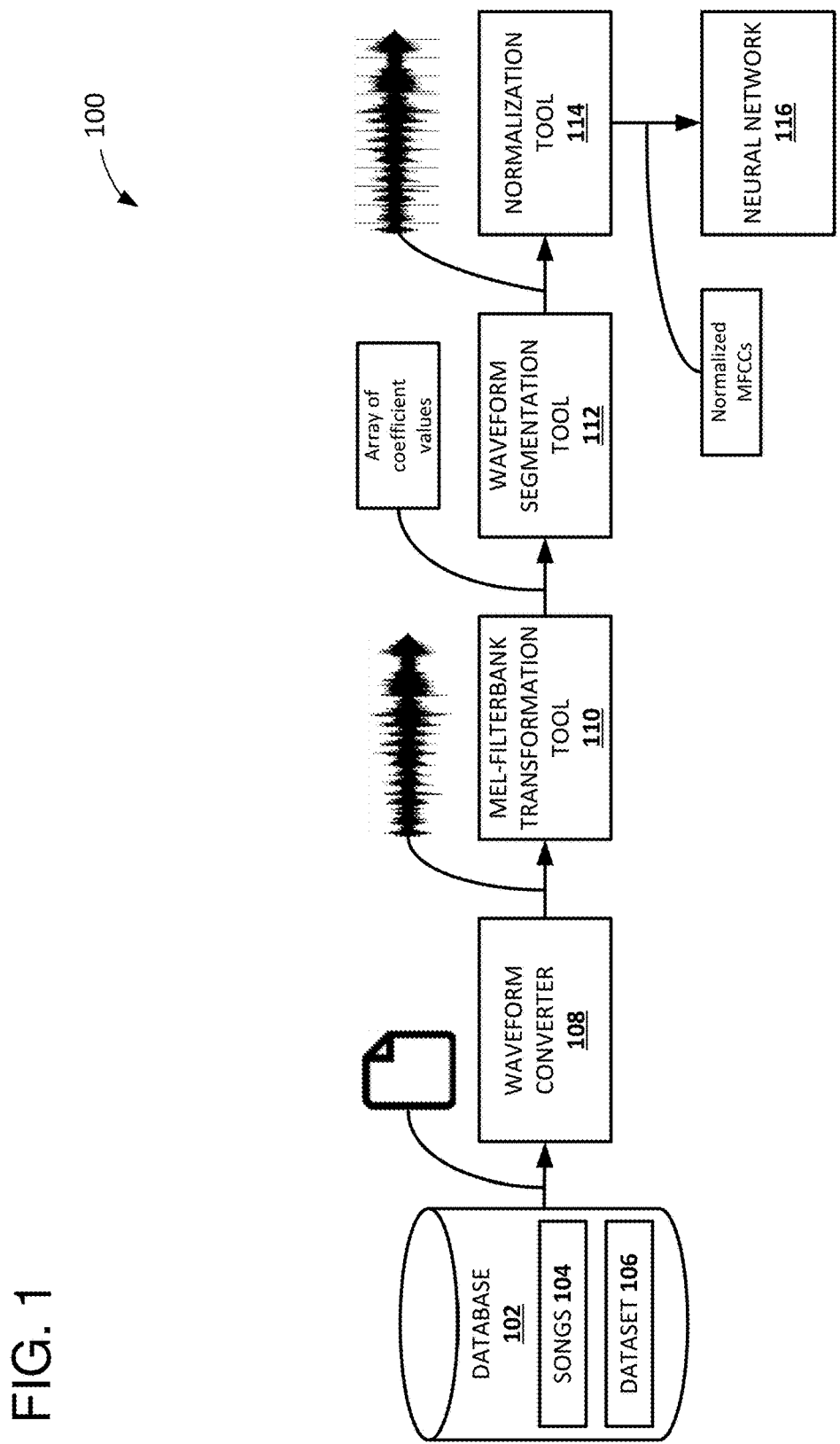
FIG. 1 is a schematic illustration of a system for identifying frisson in music as can be used in certain examples of the disclosed technology.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level descriptions of the actual operations that are performed. The actual operations that correspond to these terms may vary depending on the particular implementation and are readily discernible by one of ordinary skill in the art having the benefit of the present disclosure.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Disclosed herein are exemplary methods for identifying songs and portions of songs that tend to induce frisson in listeners. By identifying a wide variety of song fragments that produce the frisson response, the musical features that tend to induce frisson can be identified. This can be useful for musicians and composers who wish to create music that induces frisson, who can tailor their compositions to contain and/or enhance the identified features.

In certain examples of the disclosed technology, a large number of songs and musical passages that tend to produce the frisson response are cataloged. These identified songs and portions thereof that induce frisson can be collected from a variety of sources. One type of source can be academic studies on the phenomenon of frisson being induced by music. These studies often identify particular songs and musical passages that have been demonstrated, in controlled settings, to reliably produce the frisson response. Additionally, a number of Internet forums exist at websites such as Quora and Reddit where users catalog music that causes them to experience frisson. There are also websites such as Buzzfeed and others that publish articles such as lists of "chill-inducing" songs.

Another useful source of frisson-inducing music can be obtained by scraping the comments section from a large number of YouTube videos and SoundCloud files to identify terms that users included in comments that are synonymous with frisson. These include terms such as "goosebumps," "chills," "frisson," "shivers," "eargasm," etc. Often these comments included a mention of a specific section of a song that gave the listener the stated reaction. Any other source where users identify music that produces a frisson-like response can be used to catalog frisson-inducing musical moments.

In some examples, in addition to the above sources that are used to catalog frisson-inducing musical passages, a number of songs that are purposefully designed to not induce frisson are collected. This can provide a useful contrast to a learning algorithm used to distinguish musical features that produce the frisson response from musical features that do not. In some examples, this set of non-frisson inducing music includes baby lullabies, nursery rhymes, music designed for sleep aid, and relaxation music. Other types of non-frisson inducing music can also be selected and cataloged.

Once the above collection of frisson-inducing songs is completed, the data can be filtered to identify the songs that are most commonly identified as inducing frisson. This can eliminate songs that produce the frisson response for one particular listener due to a personal emotional connection with the song or because of a musical passage that does not tend to resonate with other listeners. In certain examples, the list of identified frisson-inducing songs are sorted by the number of times a song appears independently in the dataset (e.g., the number of times a different listener identifies a song as frisson-inducing). In some examples, the top 10% of this sorted dataset is selected for further analysis (e.g., the 10% of songs in the dataset that are most often identified as frisson-inducing).

After identifying this smaller subset of frisson-inducing music (e.g., the top 10% of most-identified frisson-inducing music), this list of frisson-inducing music is listened to by a team of listeners under consistent conditions (e.g. using the same headphones, volume levels, ambient temperature, etc.) to further catalog them. In a particular example, a team of listeners includes people of both genders and a variety of ages, cultural backgrounds, genre preferences, and experience levels with music (e.g., musicians and non-musicians). However, any number of listeners can be used to identify frisson-inducing passages of music. Selecting people from different cultural backgrounds can be useful for identifying more universal frisson-inducing music, since some songs or genres may tend to induce frisson in some cultures but not others due to lack of familiarity.

In certain examples, each listener independently listens to each song in the filtered list of frisson-inducing music multiple times on different days and identifies and tags particular moments that produce the frisson response for them. This can be important because simply identifying a particular song as frisson-inducing is not particularly useful since generally only one or a few moments in a song reliably induce frisson. This can also help to further eliminate songs or moments of songs that are identified as inducing frisson only because of a personal resonance with a particular listener. Additionally, including listeners from diverse cultural backgrounds who speak different languages can help to eliminate songs or moments of songs that are identified as inducing frisson only because of the power or eloquence of the semantic meaning of the lyrics. By having dedicated listeners of varying cultural backgrounds tag particular moments of songs as frisson-inducing, the musical features that produce the frisson response across broad audiences can be more easily and precisely identified.

Once each of the selected listeners tags particular moments of songs as frisson-inducing, the resulting dataset comprises a list of musical moments that one or more individuals have tagged as frisson-inducing. Other methods of acquiring a dataset of frisson-inducing musical moments can also be used. In some examples, the musical moments in this dataset are weighted based on how many of the listeners tag a particular moment as frisson-inducing. In certain examples, if one listener flags a moment, that moment is given a score of 0.55, if two listeners flag a moment, it is given a score of 0.65, if three listeners flag a moment, it is given a score of 0.75, if four listeners flag a moment, it is given a score of 0.85, and if five or more listeners flag a moment, it is given a score of 0.95. If a moment is not tagged by any listeners, it is given a score of 0. Any other suitable data weighting method can be used to create a dataset of musical moments where each moment is weighted according to how likely it is to produce a frisson response in a listener. Once such a dataset is obtained, the dataset can be analyzed using machine learning apparatus and methods as described herein such that the machine learning apparatus can determine the types of musical elements that tend to produce the frisson response.

FIG. 1 shows a block diagram of a system 100 for analyzing a number of audio files 104 with a dataset 106 of tagged musical moments as can be implemented in certain examples. As shown in FIG. 1, the system 100 comprises a database 102, a waveform converter 108, a Mel-filterbank transformation tool 110, a waveform segmentation tool 112, a normalization tool 114, and an artificial neural network 116. As used herein, the term "neural network" refers to artificial neural networks (ANNs), including ANNs implemented with general purpose processors, FPGAs, graphics processor units (GPUs) or special-purpose neural network hardware.

The database 102 includes storage storing the audio files 104 (e.g., song files) and storing the dataset 106, which contains at least one weighted value for each moment of each of the audio files 104 corresponding to how likely each moment is to induce frisson in a listener. The dataset 106 can be obtained using input from human listeners, as in the method described above, or by any other suitable method. The weighted values contained in the dataset can be determined as described above or by any other method such that the higher the weighted value for a particular moment of a song, the more likely it is to induce frisson in a listener. The audio files 104 can be in any suitable digital audio file format, including WMA, AAC, OGG, MP3 or WAV. In some examples, audio data may be extracted from a sound encoded audio-visual source (e.g., MPEG, VC-1, H.264, DVD, or Blu-Ray audio-visual sources). The waveform converter 108 can convert the audio files 104 from their native format into raw waveforms. The waveform converter 108 can then send the waveform to the Mel-filterbank transformation tool 110.

Figure 2:
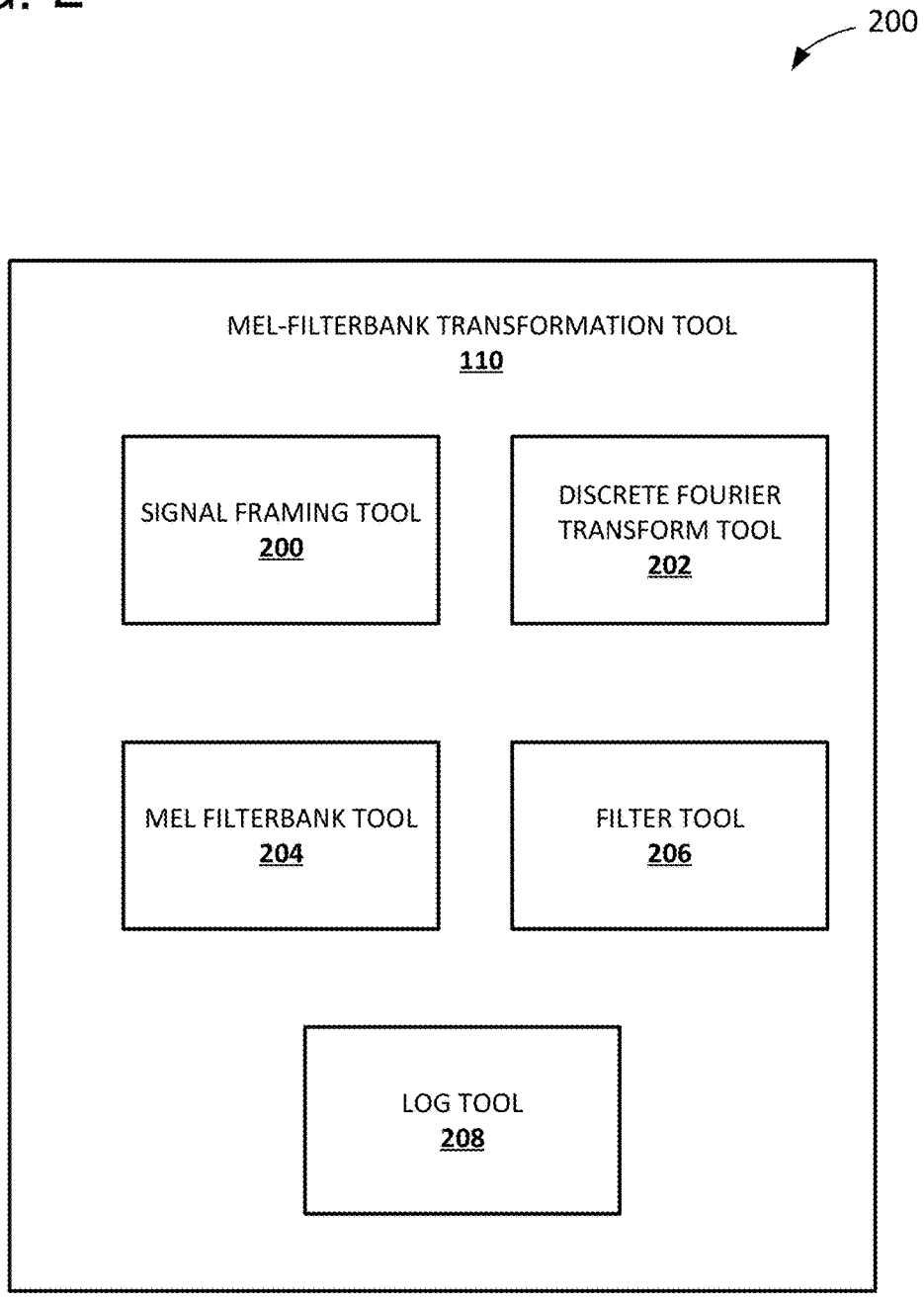
FIG. 2 is a block diagram of an example Mel-filterbank transformation tool as can be used in certain examples of the disclosed technology.

A block diagram of an example Mel-filterbank transformation tool 110 is shown in FIG. 2. The Mel-filterbank transformation tool 110 can determine the Mel-frequency cepstral coefficients (MFCCs) for the audio files 104. The MFCCs are used to represent the Mel-frequency cepstrum, which is a representation of the short-term power spectrum of an audio signal over frequency bands determined by the Mel scale, a perceptual scale of pitches judged by listeners to be equal in distance from one another. Humans tend to recognize uniform changes in pitch as less pronounced among higher frequency sounds as compared to lower frequency sounds, and the Mel scale attempts to quantify this phenomenon. The MFCCs of an audio signal tend to provide an accurate representation of the musical elements that make up an audio signal.

Referring to FIG. 2, the Mel-filterbank transformation tool 110 comprises a signal framing tool 200, a Discrete Fourier Transform (DFT) tool 202, a Mel filterbank tool 204, a filter tool 206, and a log tool 208. The signal framing tool 200 divides the waveform of a song into a series of relatively short, sequential waveform windows. This allows each short section of audio to be analyzed. In the illustrated example, the signal framing tool 200 divides a waveform into windows having a length of 125 milliseconds and a window step (the length of time between each window) of 50 milliseconds. In other examples, other suitable window lengths and window step sizes can be used. Any of the "tools" can be implemented with a general or application-specific processor executing instructions stored in a memory to implement the associated tool functionalities.

The DFT tool 202 computes the Discrete Fourier Transform of each window of audio obtained by the signal framing tool 200. This results in a power spectrum of each window of a song. In the illustrated example, the DFT tool 202 computes the DFT using 512 samples. In other examples, any other number of samples can be used to compute a DFT.

The Mel filterbank tool 204 generates a filterbank based on the Mel scale. That is, a filterbank comprising a series of triangular filters from a frequency range between a lower frequency limit and an upper frequency limit spaced according to the Mel scale. In the illustrated example, lower and upper frequencies of 0 Hz and 22,050 Hz, respectively, are used. In other examples, any suitable frequencies can be used for the lower and upper frequencies. The Mel filterbank tool 204 converts the lower frequency limit and the upper frequency limit to the Mel scale and determines a number of "melpoints" between these frequency limits that are evenly spaced according to the Mel scale. The number of melpoints chosen should be two more than the number of filterbanks desired, as explained in further detail below. In the illustrated example, 130 melpoints are chosen in order to create 128 filterbanks. In other examples, any suitable number of melpoints and corresponding filterbanks can be chosen.

Figure 3:
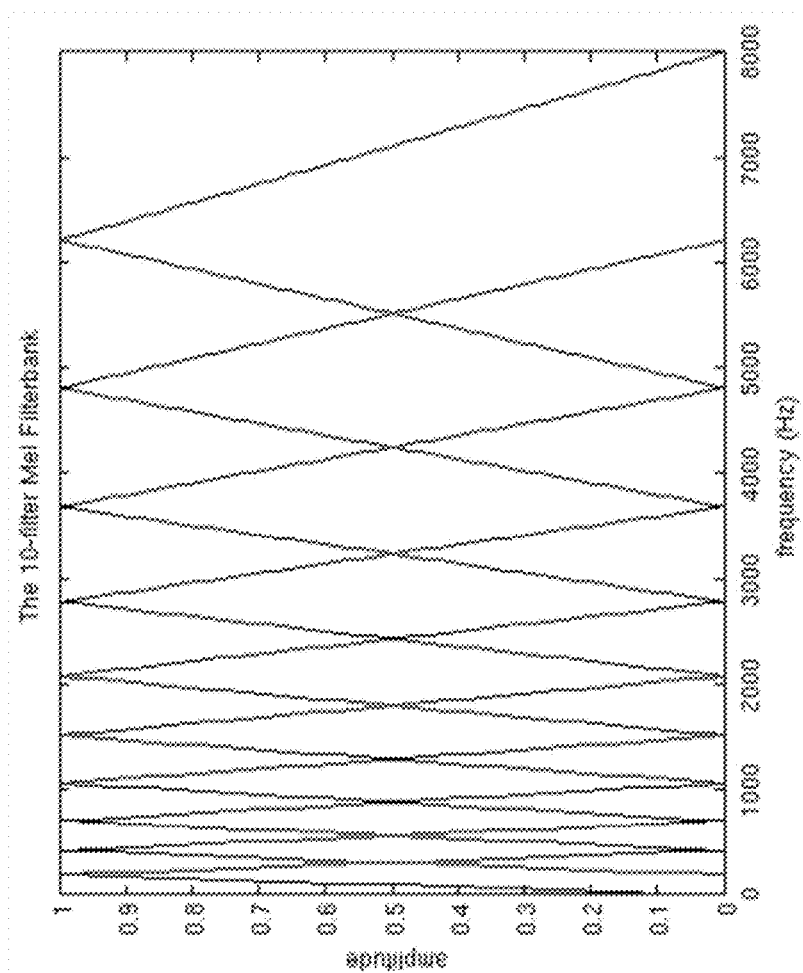
FIG. 3 is an illustration of an example Mel-filterbank.

In the illustrated example, after determining the 130 melpoints, the Mel filterbank tool 204 converts the frequencies of each of these melpoints back to a frequency in Hz and maps each of these frequencies to the nearest FFT bin computed by the DFT tool 202. This results in 130 frequency points that the Mel filterbank tool 204 uses to generate 128 triangular filterbanks as explained herein. The first such triangular filterbank has a value of 0 at the first of these 130 frequency points, a value of 1 at the second point, and a value of 0 at the third point. The second triangular filterbank has a value 0 at the second point, a value of 1 at the third point, and a value of 0 at the fourth point, and so on for each of the 128 filterbanks. FIG. 3 is a chart 300 of the frequency response of an example Mel filterbank containing ten filters from a range of 0 to 8,000 Hz.

Returning to FIG. 2, the filter tool 206 applies the filterbank generated by the Mel filterbank tool 204 to the power spectrum of each window of a song determined by the DFT tool 202. This is done by multiplying the power spectrum coefficients obtained by the DFT tool 202 by the values of a filterbank at corresponding frequencies and adding the results together. This is done for each filterbank. This results in a number of values for each window of a song 104 equal to the number of filters comprising the Mel filterbank (e.g., 128 values for each 125-millisecond window of a song in the illustrated example). Each such value corresponds to an amount of energy contained in a particular frequency range for a particular window of a song.

The log tool 208 takes the log of each of the values determined by the filter tool 206. This results in a number of values for each window of a song 104 that corresponds to an amount of energy in each filter range of the Mel filterbank on a log scale. The log scale is used to more accurately reflect the non-linear way that the human ear perceives the relative energy of sounds at different decibel ranges. These values are the MFCCs used by the system 100. In a typical Mel-filterbank transformation, the discrete cosine transform of these values would be computed. However, in the illustrated example, this step is not performed. In other examples, the discrete cosine transform of these values can be computed and the resulting values used as the MFCCs by the system 100. The MFCCs determined by the Mel-filterbank transformation tool 110 tend to capture different acoustic features of a song such as volume, timbre, pitch, tempo, rhythm, etc.

Any of the individual tools 200, 202, 204, 206, and/or 208 of the Mel-filterbank transformation tool can be implemented using, for example, a processor coupled to memory executing computer-executable instruction, a field programmable gate array (FPGA) configured to implement a particular tool, as an application-specific integrated circuit (ASIC), or other suitable hardware. In certain processor-implemented examples, the processor is a general-purpose RISC or CISC processor. In other examples, the processor can be a digital signal processor (DSP) or a special purpose processor.

Referring back to FIG. 1, as described above, the Mel-filterbank transformation tool 110 computes MFCCs for each window of a song 104. The waveform segmentation tool 112 then divides a song into a series of ten-second overlapping segments and identifies the previously computed MFCCs that correspond to each window within a ten-second segment. Any ten-second segments at the beginning or end of a song that partly fall outside of the length of the song can be buffered with silence (e.g., if a song ends at 1:00, the ten-second segment from 0:55-1:05 can include five seconds of music followed by five seconds of silence). In some examples, MFCCs can be computed using the Python Speech Features library, published by James Lyon under Massachusetts Institute of Technology licensing with appropriate input arguments.

Each such ten-second segment is tagged as either positive (induces frisson) or negative (does not induce frisson). In other examples, additional levels of tagging (e.g., a numerical value between 1 and 10, 1 and 100, or the like) can be used. Each positive segment is also weighted according to the weights contained in the dataset 106. In the illustrated example, a ten-second segment is tagged as positive if there is a frisson inducing moment 8 seconds into the ten-second segment according to the dataset 106. In other examples, segment lengths other than 10 seconds can be used and segments can be marked as positive if a frisson inducing moment occurs at other points within a segment. By marking a segment as positive if there is a frisson inducing moment 8 seconds into the ten-second segment, the system 100 can identify the context of the music leading up to the frisson inducing moment, which tends to be critically important for inducing frisson in a listener. After the waveform segmentation tool 112 finds and tags these ten-second segments, the segments and the tags are sent to the normalization tool 114.

The normalization tool 114 receives the MFCCs for each segment of a song 104 from the waveform segmentation tool 112 and normalizes the data. For example, a range of input values can be normalized by scaling the input values to be bound by the range 0.0 to 1.0. The normalization tool 114 can determine normalization factors for the MFCCs and use these factors to normalize the MFCC data. The normalization tool then feeds the normalized MFCC data and the normalization factors into the neural network 116.

In certain examples, the normalization tool 114 first selects a subset or "batch" of 100 ten-second windows at random, and this is what is fed to the network to begin the training process. In other examples, larger or smaller batches may be used. A batch can be comprised of 50 positive clips (e.g., ten-second passages with a frisson moment in the eighth second) and 50 negative clips (e.g., ten-second passages that have no marked frisson moments in them). The normalization tool 114 then feeds the normalized MFCCs of this batch of 100 clips, their associated normalization factors, the associated frisson/no frisson metadata, and the weighted frisson score of the frisson/no frisson data to the neural network 116. The neural network 116 can receive the normalized MFCCs and the normalization factors from the normalization tool 114. The neural network 116 can be trained using this data as training data in conjunction with the data from dataset 106 about which song moments induce frisson to learn the features of music that disproportionately appear in frisson inducing as opposed to non-frisson inducing passages and can therefore be interpreted as tending to cause a frisson response. In the illustrated example, the neural network 116 is a recurrent neural network (RNN) containing a long short term memory (LSTM) block and trained via an Adam optimization algorithm with a variable learning rate implemented in Tensorflow. The Adam optimization algorithm is a first-order gradient-based optimization of stochastic objective functions, based on adaptive estimates of lower-order moments. In other examples, other types of optimization algorithms (e.g., stochastic gradient descent, etc.) and other types of neural networks can be used, including feed-forward deep neural networks (DNNs), networks with feedback or memory (e.g., recurrent neural networks (RNNs), gated recurrent unit networks, and other suitable networks.

Figure 4A:
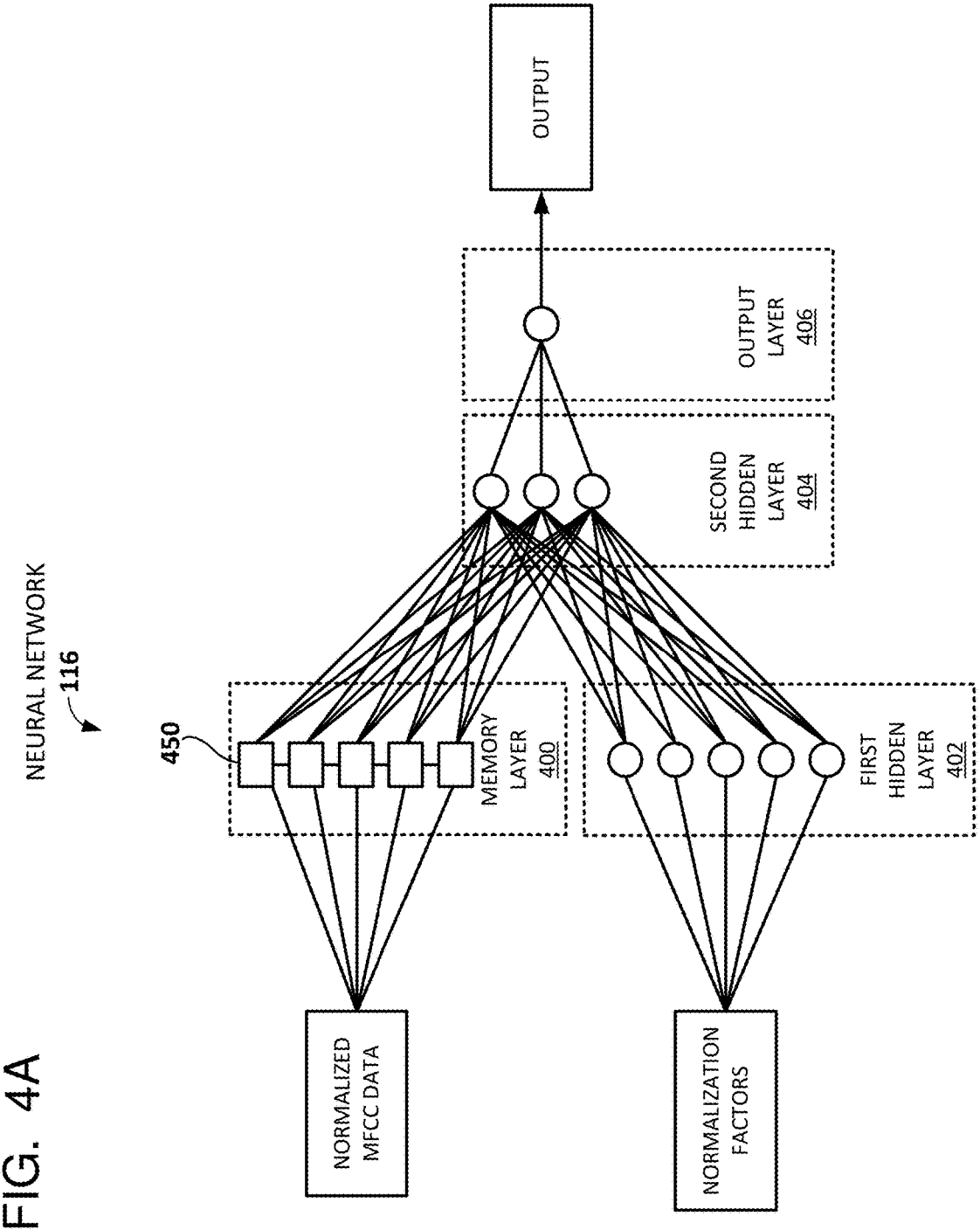
FIGS. 4A-4B are a schematic illustration of an artificial neural network as can be used in certain examples of the disclosed technology.
Figure 4B:
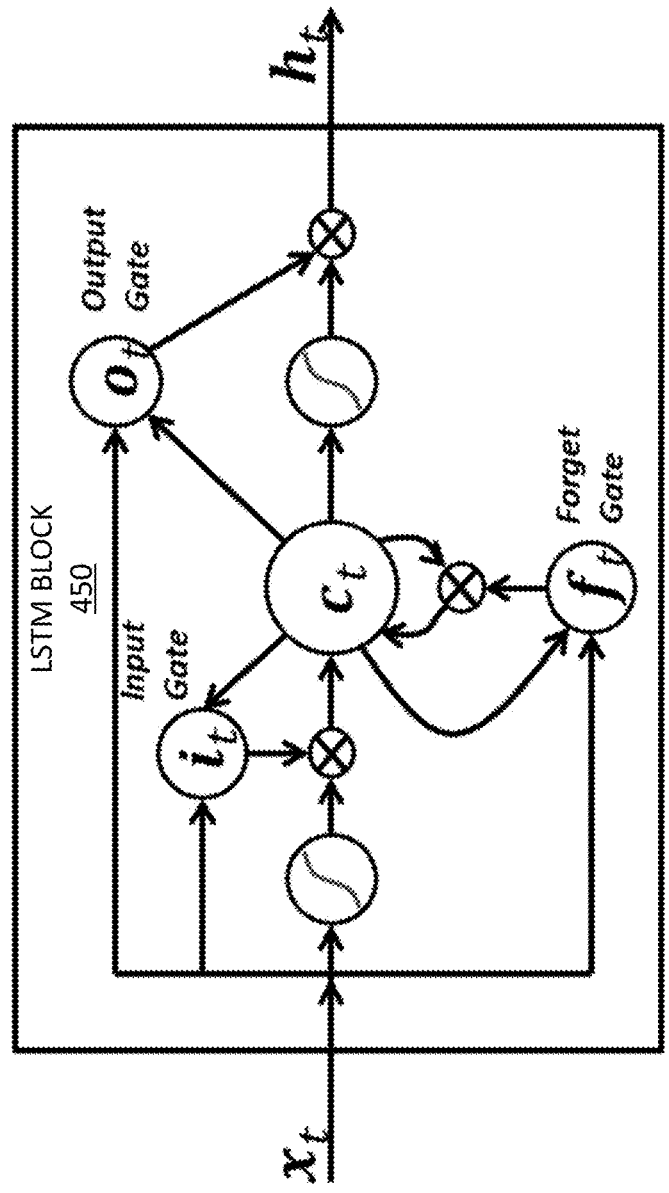

FIG. 4A shows a schematic diagram of an exemplary architecture that can be used to implement the neural network 116. In the illustrated example, the neural network 116 comprises a memory layer 400, a first hidden layer 402, a second hidden layer 404, and an output layer 406. FIG. 4 is illustrative, and so the nodes and node connections are not shown in complete detail for ease of illustration. In other examples, a different number of layers with any number of neurons in each layer can be used. In the illustrated example, the memory layer 400 receives the normalized MFCC data from the normalization tool 114. Because this data is normalized, it represents features of music independent from how relatively loud any register (i.e., frequency range) is. In the illustrated example, the memory layer 400 comprises an LSTM block 450 with a plurality of gated units, as shown in FIG. 4B. The diagram in FIG. 4B is licensed under CC BY-SA 4.0 bi BiObserver. In the illustrated example, the LSTM block 450 takes as an input the time-sequenced MFCC vectors and abstracts them as a series of 200 points. This 200-point representation is then passed to the second hidden layer. In other examples, different numbers of units and points may be used. The first hidden layer 402 receives the normalization factors from the normalization tool 114. These normalization factors are distinct from the normalized MFCC data that are passed to the memory layer 400. In the illustrated example, the normalization factors comprise a sequence of 128×2 numbers that represent the relative average and standard deviation of each MFCC bank over a 10-second segment. These normalization factors are the parameters used by the normalization tool 114 to normalize the data. These values reflect the relative volumes of each 125-millisecond window in each segment in context of an entire song. In the illustrated example, the first hidden layer 402 is comprised of 30 nodes and takes as an input the normalization factors and abstracts them as a relative frequency context across the nodes in the layer. This representation is then passed to the second hidden layer. In other examples, different numbers of nodes and points may be used.

The second hidden layer 404 combines input received from the output nodes of the memory layer 400 and the first hidden layer 402. In the illustrated example, these inputs are abstracted as a series of weights across 230 nodes in the second hidden layer, collectively representing an abstraction of the features of music that distinguish the MFCC vectors and normalization factors of frisson-inducing compared to non-frisson inducing passages. In other examples, a different number of nodes can be used. The output layer 406 receives inputs from the nodes of the second hidden layer 404 and produces a single output.

In the illustrated example, the neural network 116 is trained using an Adam optimization algorithm. The optimization algorithm compares the network's outputs (e.g., a prediction from 0.0 to 1.0 of whether a certain period, such as one second, in a particular input is likely to induce frisson in listeners) for each batch (e.g., 100 random ten-second segments) of training data with the actual marked, weighted frisson scores for each ten-second segment in the batch. It then calculates a loss value, which measures how far off the network's predictions were from the "correct" weighted values. The optimization algorithm adjusts the weights in the layers of the network accordingly and then runs another batch of passages to see if the loss values increases or decreases. This process is repeated until the loss value reaches a consistent, low value across batches. When this occurs, the network can be viewed as having "converged" or learned features comprising changes in the audio signal data that effectively distinguish moments that induce frisson from moments that do not induce frisson. In the illustrated example, the Adam optimization algorithm is implemented with a specified learning rate that decreases with each subsequent batch of training data. Once the neural network 116 is trained, it can take a new song as an input and output a prediction from 0.0-1.0 for each period (e.g., one second) of that song (and its surrounding ten-second segment) as to how likely that second of music is to produce the frisson response. This is explained in further detail below. In other examples, different optimization algorithms, learning rates, and prediction windows (e.g., 1/200 of a second) may be used.

Figure 5:
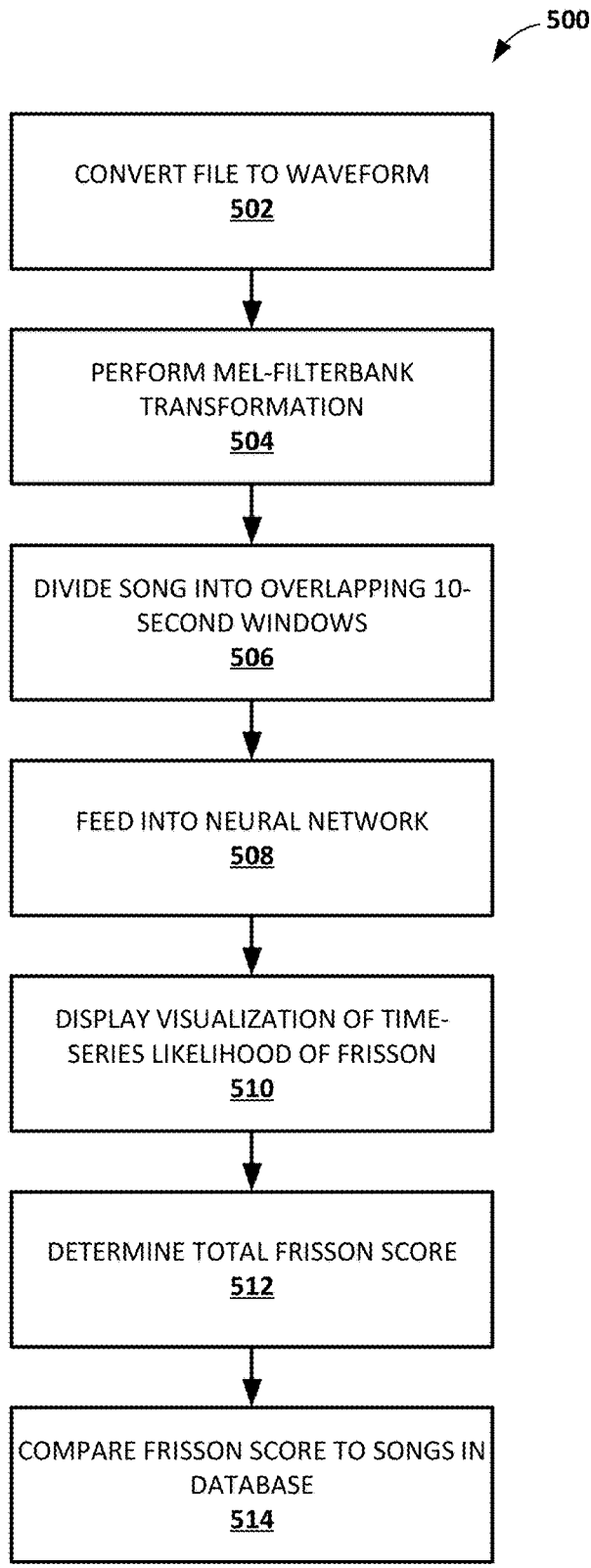
FIG. 5 is a flowchart depicting an example method of analyzing music as can be performed in certain examples of the disclosed technology.

FIG. 5 is a flowchart 500 depicting an example method of analyzing audio to determine how likely it is to produce the frisson response in listeners. For example, the hardware discussed above regarding FIGS. 1 and 2 can be used to implement the illustrated method.

At process block 502, the waveform converter 108 receives a file of the audio data to be analyzed and converts the file to a waveform. At process block 504, the Mel-filterbank transformation tool 110 performs a Mel-filterbank transformation on the waveform and determines MFCCs for the waveform as described above in connection with FIG. 2. At process block 506, the waveform segmentation tool 112 divides the transformed waveform into overlapping ten-second segments. In some examples, a segment length other than ten seconds can be used. At process block 508, the transformed segmented waveform is fed into the trained neural network 116.

As discussed above in connection with FIG. 4, after training the neural network 116 using the training data, the neural network has been trained to use the appropriate weights to apply to the various MFCCs in a ten-second segment of a song to predict how likely that ten-second segment is to induce frisson. In the illustrated example, this prediction is a score ranging from 0.0 to 1.0 that is output by the neural network 116, where 0 corresponds to a ten-second segment of a song that is least likely to induce frisson and 1.0 corresponds to a ten-second segment that is most likely to induce frisson. Each ten-second segment of a song is scored using the trained neural network 116.

In process block 510, a visualization can be displayed showing how likely each moment of a song is to induce frisson.

Figure 6:
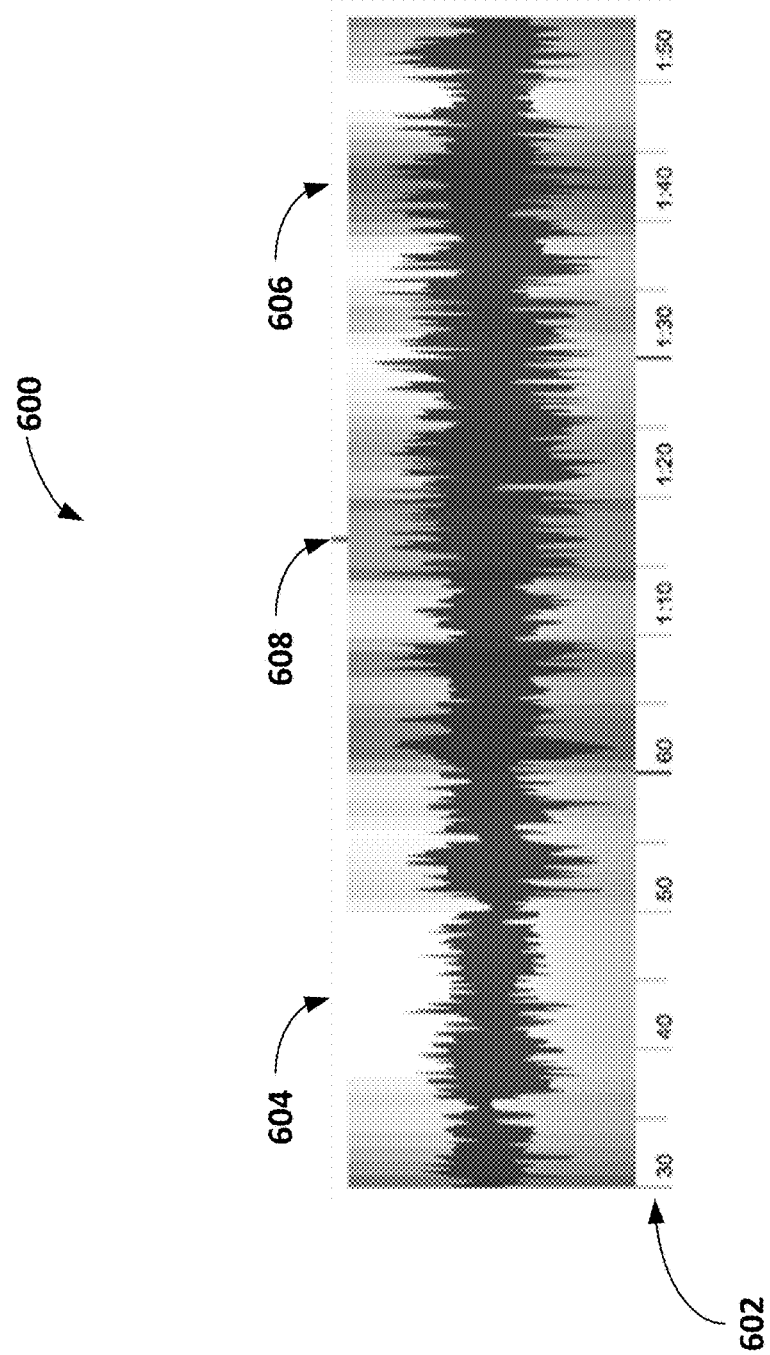
FIG. 6 is an illustration of an example visualization of frisson inducing moments in a song as can be used in certain examples of the disclosed technology.

FIG. 6 shows an exemplary visualization 600 of how likely each second of a sample song is to induce frisson. In the illustrated example of FIG. 6, the visualization 600 represents a portion of a sample song from 30 seconds into the song to 1 minute and 55 seconds into the song, as represented by timecode 602. The visualization 600 shows a heat map with a color gradient going from white to dark blue, where white corresponds to a moment not likely to induce frisson, such as portion 604 in FIG. 6, and dark blue representing a moment of a song that is most likely to induce frisson, such as portion 606 in FIG. 6. In addition, in the illustrated example, peak frisson inducing moments are highlighted in red, such as portion 608 of FIG. 6. In other examples, any other visualization method can be used.

In process block 512, the scores for each second of a song can be added together using a customized, non-linear weighting function to determine a total frisson score for a song. In process block 514, this total frisson score for a song can be compared to total frisson scores for other songs in the database 102 to determine a percentile ranking for how likely the song under consideration as a whole is to induce frisson in an average listener in comparison to other songs.

Figure 7:
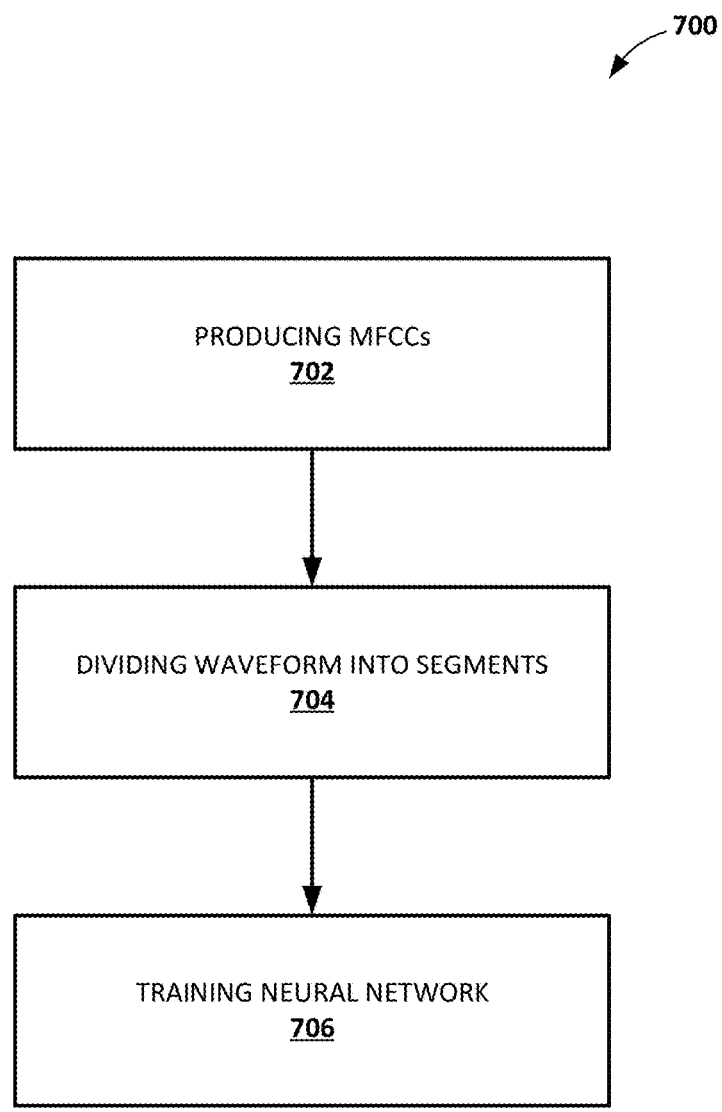
FIG. 7 is a flowchart depicting another example method of analyzing music as can be performed in certain examples of the disclosed technology.

FIG. 7 is a flowchart 700 depicting another example method of analyzing audio to determine how likely it is to induce frisson. For example, the hardware discussed above regarding FIGS. 1 and 2 can be used to implement the illustrated method.

At process block 702, the Mel-filterbank transformation tool 110 produces MFCCs for a waveform as described above in connection with FIG. 2. At process block 704, the waveform segmentation tool 112 divides the waveform into a plurality of segments. In the illustrated example, the segments are overlapping segments with a duration of 10 seconds. In other examples, the segments can have any suitable duration and can be non-overlapping. Each segment is tagged with a value indicating the likelihood that the segment will produce a frisson response in a listener. At process block 706, the neural network 116 is trained to predict a tendency of a waveform segment to induce frisson based on the MFCCs and the tagged values.

After using the system 100 to analyze a large number of songs, a large number of features have been identified that induce frisson. After reviewing the features learned by the neural network and listening to a number of musical moments that the system 100 has identified as frisson inducing, eight groupings of musical features have been identified that tend to induce frisson. While there are many other features that may induce frisson, it has been observed that various combinations of these eight groupings of features are consistent predictors of a frisson inducing moment and tend to correspond to features that academic studies of frisson have identified.

The first feature set involves acoustics related to approach and proximity, namely certain types of rapid non-linear crescendos that surpass a certain loudness threshold within 1-2 seconds, or sudden whispering and other intimacy cues in which vocalists restrict the use of their vocal folds.

The second feature set is scream-like acoustics, namely sounds with unusually high and irregular modulation rates (what the acoustics literature refers to as "roughness") and whose spectral energy is concentrated in the frequency range that mirrors the resonant cavity of the human ear (3,000 Hz to 4,000 Hz).

The third feature set involves acoustics associated with aggression (very low-register "roughness" and/or switching from modal voice to the vocal fry register) and dangerous natural events (infrasound below the range of human hearing).

The fourth feature set involves the rapid surpassing of a certain level of tonal volume (what the acoustics literature refers to as "extensity"), a combination of pressure and frequency that is distinct from loudness, subjectively perceived by listeners as "space-filling," and disproportionately produced by different instruments.

The fifth feature set involves the production and alignment of harmonic overtones from one or multiple sounds sources into a single harmonic series, or what the acoustics literature refers to as "harmonicity."

The sixth feature set involves patterns of sound that establish and then suddenly violate a listener's expectations, such as large sudden changes in dynamics (e.g., acute, discontinuous jumps in loudness), phrasing (e.g., repeated antecedent phrases that are interrupted by a consequent phrase), pitch (e.g., unexpected modulations), or rhythm (e.g., the unexpected introduction of syncopation).

The seventh feature set involves patterns of sound that delay but then finally fulfill a listener's expectations, such as certain types of cadences with non-chord notes and/or a non-linear de-acceleration into the tonic, or prolonged dissonance that resolves into consonance.

The eighth feature set involves acoustics that mimic grief vocalizations like crying or wailing, such as voice "breaks" or sudden switching between vocal registers combined with disjunct melodic motion, certain types of rapid irregular vibrato, and certain sustained notes with a non-symmetrical, non-linear rise/fall contour of pitch and volume.

In some examples, the neural network 116 can be trained to recognize each of these eight feature sets by having one or more listeners listen to a number of frisson inducing moments and tag moment to one or more of these eight feature groupings. These tagged moments can then be used as training data for the neural network 116. In some examples, the neural network 116 can be trained to identify correlations between these eight feature sets by appropriately tagging a training data set. This data can then be used to identify specific subsets of the eight feature groupings that best work together in creating frisson producing passages. In some examples, an individual user can tag particular moments of songs that most induce frisson for them and train the neural network 116 to identify frisson inducing moments that are particular to that individual. In some examples, the system 100 can use these eight feature sets to automatically revise certain sections of a song to increase its likelihood of inducing frisson among broad audiences.

Representative Computing Environment

Figure 9:
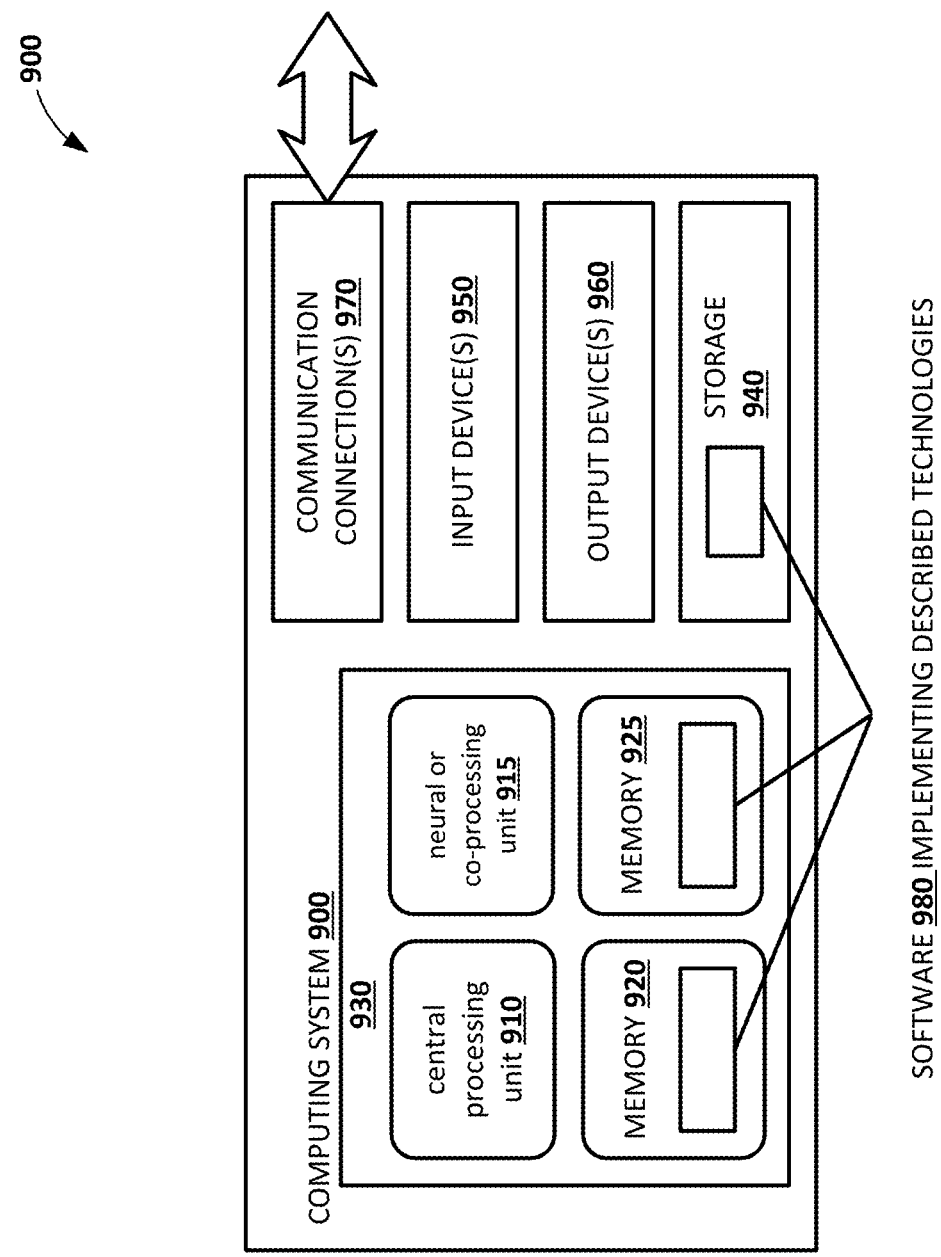
FIG. 9 is a diagram schematically depicting a computing environment suitable for implementation of certain examples of the disclosed technology.

FIG. 9 depicts a generalized example of a suitable computing environment 900 in which software and control algorithms for the described technology may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, gaming system, mobile device, programmable automation controller, etc.).

Figure 8:
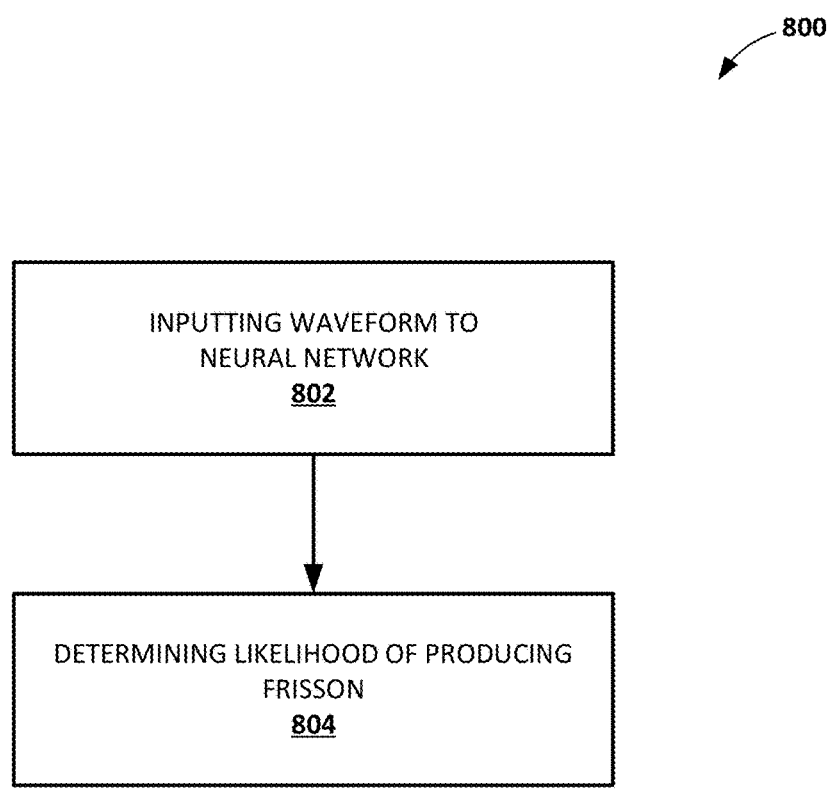
FIG. 8 is a flowchart depicting another example method of analyzing music as can be performed in certain examples of the disclosed technology.

With reference to FIG. 9, the computing environment 900 includes one or more processing units 910, 915 and memory 920, 925 (e.g., for storing data indicative of stage vibration). In FIG. 9, this basic configuration 830 is included within a dashed line. The processing units 910, 915 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 8 shows a central processing unit 910 as well as neural processing units (NPUs) or other co-processing units 915. Neural processing units include specialized hardware units for accelerating training and evaluation of artificial neural networks. NPUs produced by certain vendors are also referred to as tensor processing units (TPUs), neural network processors (NNPs), intelligence processing units (IPUs), vision processing units (VPUs), or graph processing units (GPUs). In some example, graphic processing units can be used to accelerate training and evaluation of neural networks.

The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, in some embodiments, the computing environment 900 includes storage 940, one or more input devices 950, one or more output devices 960, and one or more communication connections 970. An interconnection mechanism (not shown) such as a bus, controller, or network, interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium that can be used to store information in a non-transitory way and can be accessed within the computing environment 900. The storage 940 stores instructions for the software 980 implementing one or more innovations described herein (e.g., for transmitting data of a monitored individual in response to a request).

The input device(s) 950 may be, for example: a touch input device, such as a keyboard, mouse, microphone, pen, or trackball; a voice input device; a scanning device; any of various sensors; another device that provides input to the computing environment 900; or combinations thereof. For video encoding, the input device(s) 950 may be a camera, video card, TV tuner card, or similar device that accepts video input in analog or digital form, or a CD-ROM or CD-RW that reads video samples into the computing environment 900. The output device(s) 960 may be a display, printer, speaker, CD-writer, speaker, or another device that provides output from the computing environment 900.

The communication connection(s) 970 enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood to one of ordinary skill in the art having the benefit of the present disclosure that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Additional Examples of the Disclosed Technology

Additional examples of the disclosed subject matter are discussed herein in accordance with the examples discussed above.

According to one example of the disclosed technology, a method includes producing Mel-frequency cepstral coefficients corresponding to a waveform, dividing the waveform into a plurality of segments, where at least one of the segments is tagged with a value indicating a likelihood that the segment will induce frisson in a listener, and training a neural network with the Mel-frequency cepstral coefficients and the segment tag values to generate predictions of a tendency of a waveform segment to induce frisson.

In some examples of the method, the Mel-frequency cepstral coefficients are produced by performing a Mel-filterbank transformation on the waveform.

In some examples of the method, at least two of the segments are overlapping with each of the segments having a duration of at least 10 seconds.

In some examples of the method, the value corresponding to each segment corresponds to how likely the segment is to induce frisson at a predetermined time in the segment.

In some examples of the method, the waveform comprises a musical song.

In some examples of the method, the method further includes converting a digital representation of an audio file or stream into a time domain waveform before performing a Mel-filterbank transformation on the waveform to produce the Mel-frequency cepstral coefficients.

In some examples of the method, producing Mel-frequency cepstral coefficients comprises dividing at least a portion of the waveform into a plurality of sequential time windows, performing a discrete Fourier transform on each of the sequential time windows, generating a Mel filterbank having a predetermined number of filters, applying the generated Mel filterbank to the discrete Fourier transform of each of the windows, and calculating a logarithm of each of the values obtained by applying the Mel filterbank to the discrete Fourier transform of each of the windows, and calculating a logarithm of each of the values obtained by applying the Mel filterbank to the discrete Fourier transform of each of the sequential time windows to produce Mel-frequency cepstral coefficients for each respective window.

In some examples of the method, the sequential windows have a duration of at least 125 milliseconds. In some examples of the method, the sequential windows are at least 50 milliseconds apart from each other. In some examples of the method, the discrete Fourier transform is performed using 4, 8, 16, 32, 64, 128, 256, or 512 samples. In some examples of the method, the Mel filterbank comprises 4, 8, 16, 32, 64, or 128 filters.

In some examples of the method, the method further comprises computing normalization factors for the Mel-frequency cepstral coefficients and normalizing the Mel-frequency cepstral coefficients based on the computed normalization factors before inputting the Mel-frequency cepstral coefficients into the neural network.

In some examples of the method, the neural network comprises a memory layer to receive the normalized Mel-frequency cepstral coefficients for a segment of the waveform, a first hidden layer to receive the normalization factors, a second hidden layer to receive outputs from the memory layer and the first hidden layer, and an output layer to produce an output value corresponding to how likely the segment is to induce frisson.

According to another example of the disclosed technology, a method includes providing at least one segment of an audio waveform as input to a neural network, the neural network being trained using Mel-frequency cepstral coefficients, and based on output of the trained neural network, determining a likelihood that the at least one segment will induce frisson in a listener.

In some examples of the method, the neural network is trained prior to providing the at least one segment by a training method, the training method including producing the Mel-frequency cepstral coefficients corresponding to training waveforms by performing a Mel-filterbank transformation on the training waveforms, the training waveforms comprising time segments associated with a value indicating a likelihood that audio generated with the waveform segment will produce a frisson response in a listener, and training the neural network via an Adam optimization algorithm with the Mel-frequency cepstral coefficients and values for the training waveforms indicating a likelihood that audio generated for a respective waveform segment will induce frisson based on the Mel-frequency cepstral coefficients, thereby producing a trained neural network.

In some examples of the method, producing the Mel-frequency cepstral coefficients comprises dividing at least a portion of the waveform into a plurality of sequential windows, performing a discrete Fourier transform on each of the sequential windows, applying a Mel filterbank to the discrete Fourier transform of each of the windows, and taking a log of each of the values obtained by applying the Mel filterbank to the discrete Fourier transform of each of the windows to obtain Mel-frequency cepstral coefficients for each window.

In some examples of the method, the method further includes displaying a visualization of the waveform, where the visualization indicates how likely portions of the visualized waveform are to induce frisson.

In some examples of the method, the method further includes determining an overall score for the waveform corresponding to a calculated likelihood that the waveform is to induce frisson based on likelihoods calculated for time segments of the waveform to induce frisson.

In some examples of the method, the method further includes comparing the overall score for the waveform to scores for other waveforms to determine how likely the waveform is to induce frisson in comparison to the other waveforms.

In some examples of the method, a non-transitory computer-readable storage media stores computer-executable instructions that when executed by a computer cause the computer to perform the method.

According to another example of the disclosed technology, a system includes at least one processor, memory coupled to the processor, computer-readable storage media storing computer-executable instructions that when executed by the processor, cause the processor to perform a method of processing a waveform, the instructions including instructions to produce Mel-frequency cepstral coefficients corresponding to the waveform, instructions to divide at least a portion of the waveform into a plurality of segments, where each segment is tagged with a value corresponding to a likelihood the respective segment will induce frisson, and instructions to send the Mel-frequency cepstral coefficients and the tagged values to a neural network.

In some examples of the system, the instructions comprise instructions to train the neural network to generate a likelihood that a particular input segment is to induce frisson, based at least in part on the Mel-frequency cepstral coefficients and the tagged values.

In some examples of the system, the instructions comprise instructions to receive a likelihood that a particular segment when input to the neural network will induce frisson, based at least in part on the Mel-frequency cepstral coefficients and the tagged values.

In some examples of the system, the system further includes instructions to convert a digital representation of a song or other audio data into a waveform.

In some examples of the system, the system further includes instructions to determine normalization factors for the Mel-frequency cepstral coefficients of each segment and to, based on the determined normalization factors, normalize the Mel-frequency cepstral coefficients for each segment of the waveform.

In some examples of the system, the instructions to produce Mel-frequency cepstral coefficients include instructions to divide the waveform into a plurality of sequential, overlapping windows, instructions to perform a discrete Fourier transform on each of the sequential windows, instructions to generate a Mel filterbank, instructions to apply the generated Mel filterbank to the discrete Fourier transform of each of the windows, and instructions to calculate a logarithm of each of the values obtained by applying the Mel filterbank to the discrete Fourier transform of each of the windows to obtain Mel-frequency cepstral coefficients for each window.

In some examples of the disclosed technology, a method includes presenting a song to a plurality of listeners, instructing each listener to identify particular moments of the song that induce frisson for them, and assigning a score to each moment of the song based on how many listeners identified each moment as inducing frisson. The assigned scores can be stored in a computer-readable storage medium as a database, file, or other suitable format, and later retrieved for use by other methods disclosed herein for identifying frisson.

In some examples of the method, presenting the song to a plurality of listeners includes playing an audio recording of the song to each of the plurality of listeners under similar conditions. In some examples, the plurality of listeners have a variety of backgrounds. In some examples, presenting the song to a plurality of listeners includes playing an audio recording of the song to each of the plurality of listeners multiple times on different days.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. A method comprising:
with a computer:
  producing Mel-frequency cepstral coefficients corresponding to a waveform;
  dividing the waveform into a plurality of segments, wherein at least one of the segments is tagged with a value indicating a likelihood that the segment will induce frisson in a listener; and
  training a neural network with the Mel-frequency cepstral coefficients and the segment tag values to generate predictions of a tendency of a waveform segment to induce frisson.

2. The method of claim 1, wherein the Mel-frequency cepstral coefficients are produced by performing a Mel-filterbank transformation on the waveform.

3. The method of claim 1, wherein at least two of the segments are overlapping, each of the segments having a duration of at least 10 seconds.

4. The method of claim 1, wherein the value corresponding to each segment corresponds to how likely the segment is to induce frisson at a predetermined time in the segment.

5. The method of claim 1, wherein the waveform comprises a musical song.

6. The method of claim 1, further comprising:
  converting a digital representation of an audio file or stream into a time domain waveform before performing a Mel-filterbank transformation on the waveform to produce the Mel-frequency cepstral coefficients.

7. The method of claim 1, wherein producing Mel-frequency cepstral coefficients comprises:

dividing at least a portion of the waveform into a plurality of sequential time windows;
performing a discrete Fourier transform on each of the sequential time windows;
generating a Mel filterbank having a predetermined number of filters;
applying the generated Mel filterbank to the discrete Fourier transform of each of the windows; and
calculating a logarithm of each of the values obtained by applying the Mel filterbank to the discrete Fourier transform of each of the sequential time windows to produce Mel-frequency cepstral coefficients for each respective window.

8. The method of claim 1, wherein the sequential windows have a duration of at least 125 milliseconds.

9. The method of claim 1, wherein the sequential windows are at least 50 milliseconds apart from each other.

10. The method of claim 1, wherein the discrete Fourier transform is performed using 4, 8, 16, 32, 64, 128, 256, or 512 samples.

11. The method of claim 1, wherein the Mel filterbank comprises 4, 8, 16, 32, 64, or 128 filters.

12. The method of claim 1, further comprising computing normalization factors for the Mel-frequency cepstral coefficients and normalizing the Mel-frequency cepstral coefficients based on the computed normalization factors before inputting the Mel-frequency cepstral coefficients into the neural network.

13. The method of claim 12, wherein the neural network comprises:
a memory layer to receive the normalized Mel-frequency cepstral coefficients for a segment of the waveform;
a first hidden layer to receive the normalization factors;
a second hidden layer to receive outputs from the memory layer and the first hidden layer; and
an output layer to produce an output value corresponding to how likely the segment is to induce frisson.

14. A method comprising:
producing Mel-frequency cepstral coefficients corresponding to training waveforms by performing a Mel-filterbank transformation on the training waveforms, the training waveforms comprising time segments associated with a value indicating a likelihood that audio generated with the waveform segment will produce a frisson response in a listener;
training a neural network via an Adam optimization algorithm with the Mel-frequency cepstral coefficients and values for the training waveforms indicating a likelihood that audio generated for a respective waveform segment will induce frisson based on the Mel-frequency cepstral coefficients, thereby producing a trained neural network;
providing at least one segment of an audio waveform as input to the trained neural network, the neural network being trained using the Mel-frequency cepstral coefficients; and
based on output of the trained neural network, determining a likelihood that the at least one segment will induce frisson among a plurality of listeners.

15. The method of claim 14, wherein producing the Mel-frequency cepstral coefficients comprises:
dividing at least a portion of the waveform into a plurality of sequential windows;
performing a discrete Fourier transform on each of the sequential windows;
applying a Mel filterbank to the discrete Fourier transform of each of the windows; and
taking a log of each of the values obtained by applying the Mel filterbank to the discrete Fourier transform of each of the windows to obtain Mel-frequency cepstral coefficients for each window.

16. The method of claim 14, further comprising displaying a visualization of the waveform, wherein the visualization indicates how likely portions of the visualized waveform are to induce frisson.

17. The method of claim 14, further comprising determining an overall score for the waveform corresponding to a calculated likelihood that the waveform is to induce frisson based on likelihoods calculated for time segments of the waveform to induce frisson.

18. The method of claim 17, further comprising comparing the overall score for the waveform to scores for other one or more waveforms to determine how likely the waveform is to induce frisson in comparison to the other waveforms.

19. One or more non-transitory computer-readable storage media storing computer-executable instructions that when executed by a computer, cause the computer to perform the method of claim 14.

20. A system comprising:
at least one processor;
memory coupled to the processor;
computer-readable storage media storing computer-executable instructions that when executed by the processor, cause the processor to perform a method of processing a waveform; the instructions comprising:
instructions, which when executed by the processor, cause the system to produce Mel-frequency cepstral coefficients corresponding to the waveform;
instructions, which when executed by the processor, cause the system to divide at least a portion of the waveform into a plurality of segments, wherein each segment is tagged with a value corresponding to a likelihood the respective segment will induce frisson;
instructions, which when executed by the processor, cause the system to send the Mel-frequency cepstral coefficients and the tagged values to a memory layer of a neural network;
instructions, which when executed by the processor, cause the system to determine and send normalization factors for the Mel-frequency cepstral coefficients of each segment to a hidden layer of the neural network; and
instructions, which when executed by the processor, cause the system to generate a likelihood that a segment of the plurality of segments will induce frisson.

21. The system of claim 20, wherein the instructions comprise:
instructions, which when executed by the processor, cause the system to train the neural network to generate a likelihood that a particular input segment is to induce frisson, based at least in part on the Mel-frequency cepstral coefficients and the tagged values.

22. The system of claim 20, wherein the instructions comprise:
instructions, which when executed by the processor, cause the system to receive a likelihood that a particular segment when input to the neural network will induce frisson, based at least in part on the Mel-frequency cepstral coefficients and the tagged values.

23. The system of claim 20, further comprising instructions to convert a digital representation of a song or other audio data into a waveform.

24. The system of claim 20, further comprising instructions, which when executed by the processor, cause the system to, based on the determined normalization factors, normalize the Mel-frequency cepstral coefficients for each of the plurality of segments.

\* \* \* \* \*